United States Patent
Harber et al.

(10) Patent No.: US 9,574,399 B2
(45) Date of Patent: Feb. 21, 2017

(54) MAINTENANCE CART WITH AIR FILTRATION

(71) Applicant: Abatement Technologies, Inc., Suwanee, GA (US)

(72) Inventors: Blair Lawrence Harber, St. Davids (CA); Lynette Raville Mathews, Atlanta, GA (US); Adam Brian Hunninck, Stevensville (CA); Leonard Gene Simmons, Suwanee, GA (US)

(73) Assignee: Abatement Technologies, Inc., Suwanee, GA (US)

( * ) Notice: Subject to any disclaimer, the term of this patent is extended or adjusted under 35 U.S.C. 154(b) by 0 days.

(21) Appl. No.: 14/744,691

(22) Filed: Jun. 19, 2015

(65) Prior Publication Data

US 2016/0016599 A1    Jan. 21, 2016

Related U.S. Application Data

(60) Provisional application No. 62/025,208, filed on Jul. 16, 2014.

(51) Int. Cl.
*B62B 3/00* (2006.01)
*E06C 1/397* (2006.01)
*E06C 1/12* (2006.01)

(52) U.S. Cl.
CPC .............. *E06C 1/397* (2013.01); *E06C 1/125* (2013.01)

(58) Field of Classification Search
CPC ............ E06C 1/125; E06C 1/397; E06C 1/12; E06C 5/00; E06C 5/24; B08B 15/00; B08B 15/02; B08B 15/026; E04H 1/12; E04H 1/125; E04H 1/1277; B62B 3/00; B62B 3/02; B62B 3/04; B62B 3/002; B62B 2206/06
See application file for complete search history.

(56) References Cited

U.S. PATENT DOCUMENTS

| | | | | |
|---|---|---|---|---|
| 3,031,027 A | * | 4/1962 | Mitchell | B66F 11/04 134/84 |
| 3,664,458 A | * | 5/1972 | Sterns | E06C 1/397 182/102 |
| 5,067,504 A | * | 11/1991 | Coleman, III | B08B 15/026 134/172 |
| 5,080,701 A | | 1/1992 | Howard et al. | |
| 5,102,179 A | * | 4/1992 | Royer | A01M 31/025 182/141 |

(Continued)

OTHER PUBLICATIONS http://www.hepacart.com/, (known to Applicant no later than Jul. 15, 2014).

(Continued)

*Primary Examiner* — James M Dolak
(74) *Attorney, Agent, or Firm* — Kilpatrick Townsend & Stockton LLP

(57) ABSTRACT

A maintenance/construction cart that facilitates wall and ceiling access while isolating the interior of the cart from the surrounding environment. The cart is configured such that its height can be easily adjusted by an operator to provide access to ceilings of different heights while maintaining the seal between the interior of the cart and the surrounding environment while structurally supporting a ladder leaning against a surface of the cart. In some embodiments, the cart includes an air filtration unit.

27 Claims, 12 Drawing Sheets

(56) References Cited

U.S. PATENT DOCUMENTS

| | | | | |
|---|---|---|---|---|
| 5,542,495 | A * | 8/1996 | Aulakh | B24C 3/06 182/141 |
| 5,558,112 | A * | 9/1996 | Strieter | B09B 3/0066 134/103.2 |
| 5,862,827 | A * | 1/1999 | Howze | A01M 31/025 135/140 |
| 6,383,242 | B1 * | 5/2002 | Rogers | B01D 46/42 454/63 |
| 6,604,606 | B1 * | 8/2003 | McDougal | E06C 5/04 182/115 |
| 6,637,549 | B1 * | 10/2003 | Lopacki | A01M 31/02 182/115 |
| 6,948,587 | B2 * | 9/2005 | Griffiths | A01M 31/02 182/116 |
| 7,014,238 | B2 * | 3/2006 | Gonzalez | B60P 1/02 135/88.01 |
| 7,406,978 | B2 * | 8/2008 | Mintie | B08B 15/00 135/131 |
| 7,448,945 | B2 | 11/2008 | Bessent | |
| 7,500,334 | B2 * | 3/2009 | Stevens | E04G 1/22 52/117 |
| 7,815,015 | B2 * | 10/2010 | Kerns | A01M 31/025 182/127 |
| 9,091,087 | B2 * | 7/2015 | Watford | E06C 1/28 |
| 9,458,641 | B2 * | 10/2016 | Harlow | E04H 1/1277 |

OTHER PUBLICATIONS http://www.prevent-lss.com/TheSolution.aspx, (known to Applicant no later than Jul. 15, 2014).

http://www.cleanworkbooth.com/Details.aspx, (known to Applicant no later than Jul. 15, 2014).

* cited by examiner

MAINTENANCE CART WITH AIR FILTRATION

CROSS REFERENCE TO RELATED APPLICATIONS

This application is related to and claims priority benefits from U.S. Provisional Application Ser. No. 62/025,208 ("the '208 application"), filed on Jul. 16, 2014, entitled MAINTENANCE CART WITH AIR FILTRATION. The '208 application is hereby incorporated in its entirety by this reference.

FIELD OF THE INVENTION

This invention relates to devices and methods for facilitating wall and ceiling access while providing air filtration to contain and capture hazardous and/or non-hazardous particulate, biological, and gas phase contaminants released into the air as a result of these activities.

BACKGROUND

Similar to virtually any building, healthcare facilities, such as hospitals, require construction and maintenance including tasks necessitating access to areas that cannot be regularly cleaned, such as within walls or above a ceiling. However, unlike many other facilities, healthcare and other facilities include requirements related to cleanliness and minimizing the risk of hospital acquired infections (HAIs) caused by hazardous airborne contaminants. There is a need to protect patients and employees from exposure to construction particles that can potentially transmit airborne infectious diseases.

The design of products, such as maintenance/construction carts, that facilitate wall and ceiling access in sensitive environments is challenging because there are a large number of demanding requirements and desired features, some of which compete with each other. For instance, in addition to isolating the non-sanitized construction/maintenance environment from the sanitary healthcare environment, it is desirable that such products be compact, lightweight, easily transported, powered, operated, maintained, cleaned, and stored. It is desirable that these products be durable and able to function in numerous different environments, as well as economical to purchase and operate.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Disclosed is a maintenance/construction cart that facilitates wall and ceiling access while isolating the interior of the cart from the surrounding environment. The cart is configured such that its height can be easily adjusted by an operator to provide access to ceilings of different heights while maintaining the seal between the interior of the cart and the surrounding environment and structurally supporting a ladder leaning against a surface of the cart.

BRIEF DESCRIPTION OF THE DRAWINGS

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-14 illustrate an exemplary embodiment of a maintenance/construction cart 100 that facilitates wall and ceiling access while isolating the maintenance/construction cart 100 from the surrounding environment. As described in more detail below, the height of the maintenance/construction cart 100 can be infinitely adjusted to allow access to and physical sealing contact with ceilings of different heights, and the cart is configured so that its interior is sealed from the surrounding environment.

Figure 1:
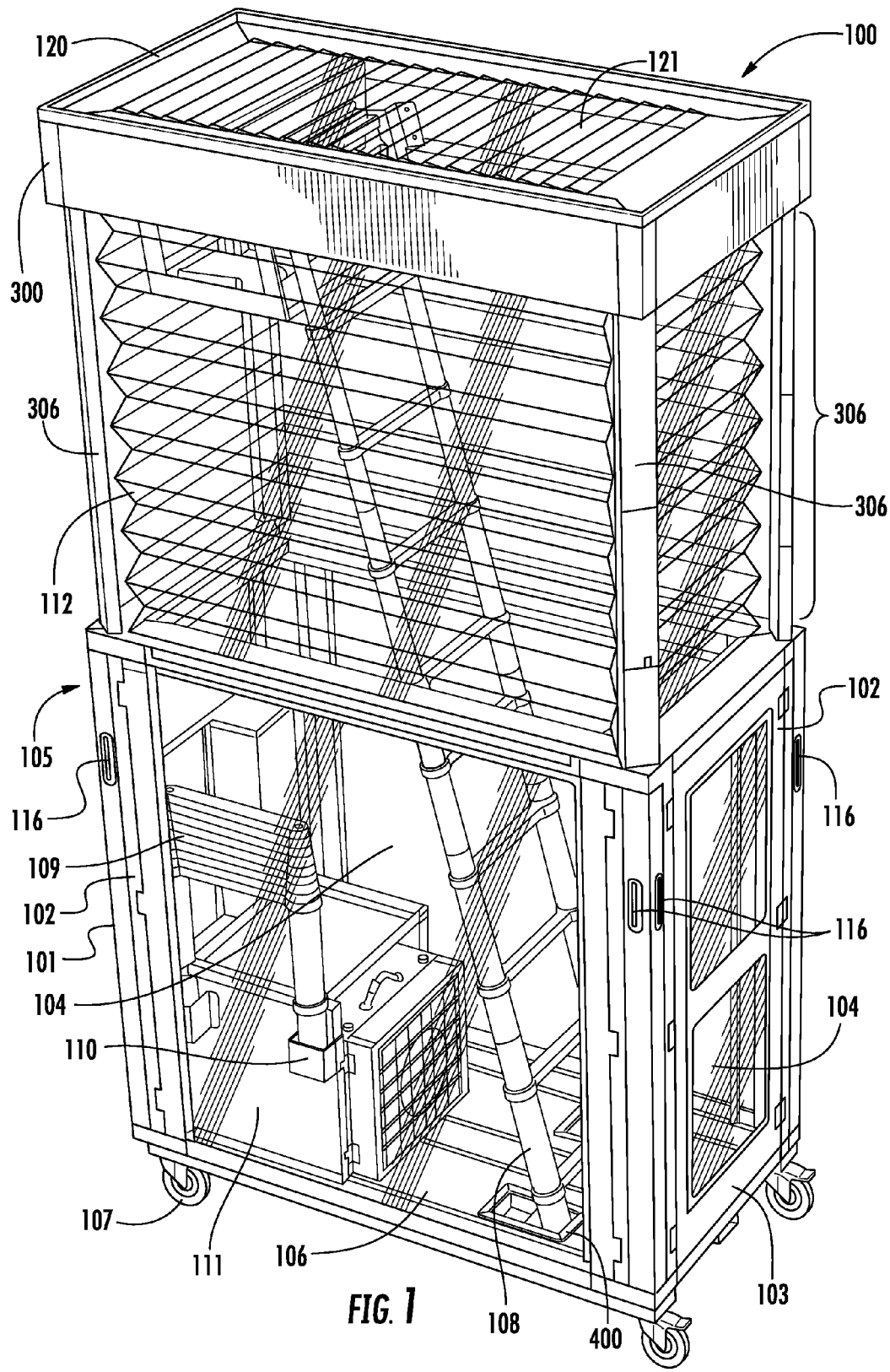
FIG. 1 is a perspective view of the front, top, and left side of a maintenance/construction cart according to one embodiment of this invention, shown with the upper structure in the raised position.
Figure 2:
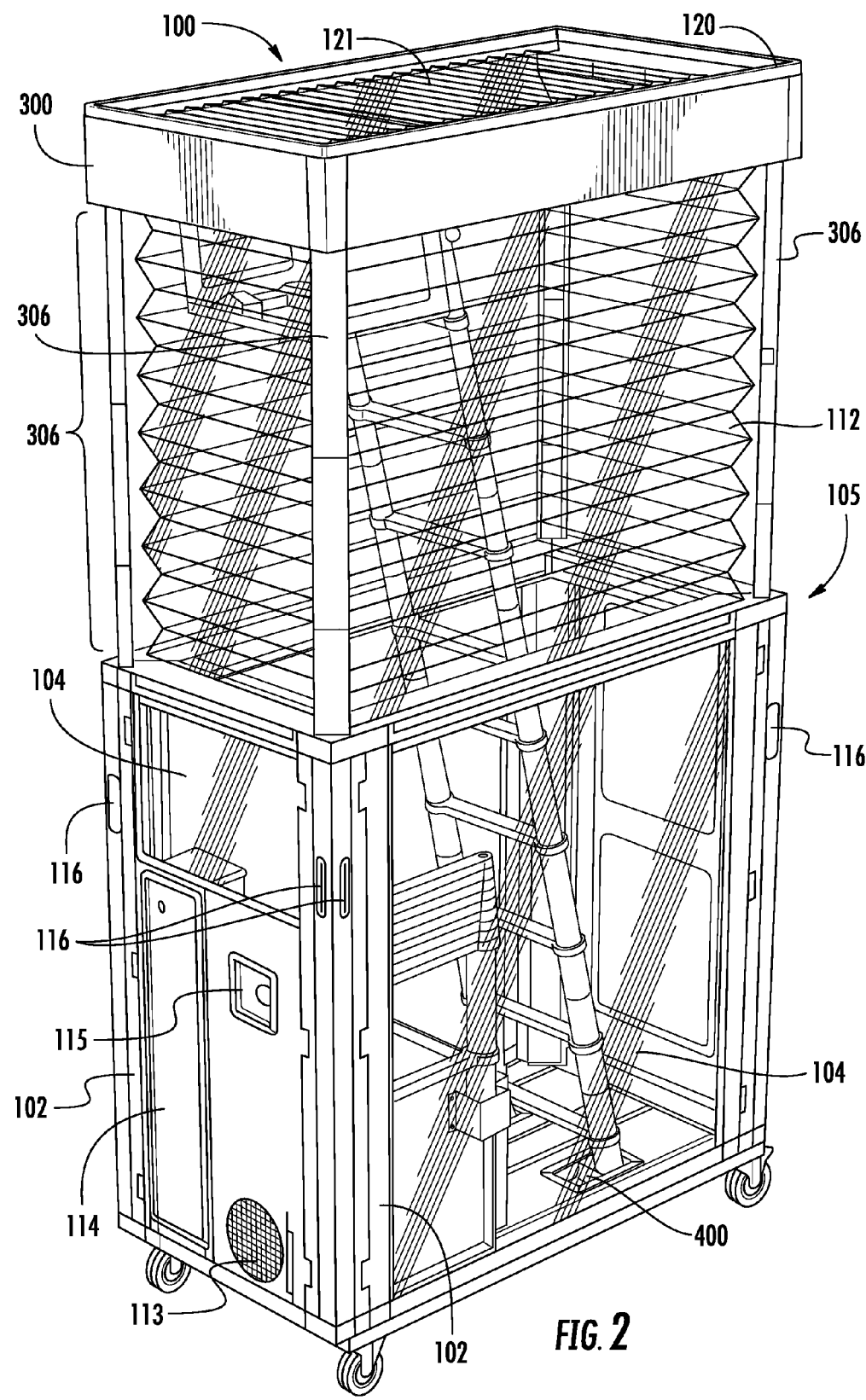
FIG. 2 is a perspective view of the rear, top, and left side of the cart depicted in FIG. 1.

As illustrated in FIGS. 1-2, maintenance/construction cart 100 includes a lower structure 101 with side walls 102 that extend from floor 106. Side walls 102 and floor 106 are constructed with respect to lower structure 101 to seal the interior of the cart 100 from the surrounding environment to reduce the transmission of hazardous airborne contaminants from the inside of cart 100 into the surrounding environment.

Lower structure 101, floor 106, and/or side walls 102 may be formed of any suitable material including, but not limited to, aluminum, anodized aluminum, steel, stainless steel, aramid fibers, Lexan, polycarbonate, polypropylene, other metallic or sheet metal materials, composite materials, or other materials. One or more of the side walls 102 may include an access door 103 that provides access to the interior of the cart 100. Any suitable portion of the one or more side walls 102 may be transparent as desired, such as transparent portions 104. If desired, the lower structure 101 may include one or more handgrips 116 to facilitate transport of the cart 100. As shown in FIGS. 1 and 2, lower structure 101 may include two handgrips 116 at each corner (a total of eight) or any suitable number and arrangement of handgrips.

Figure 13:
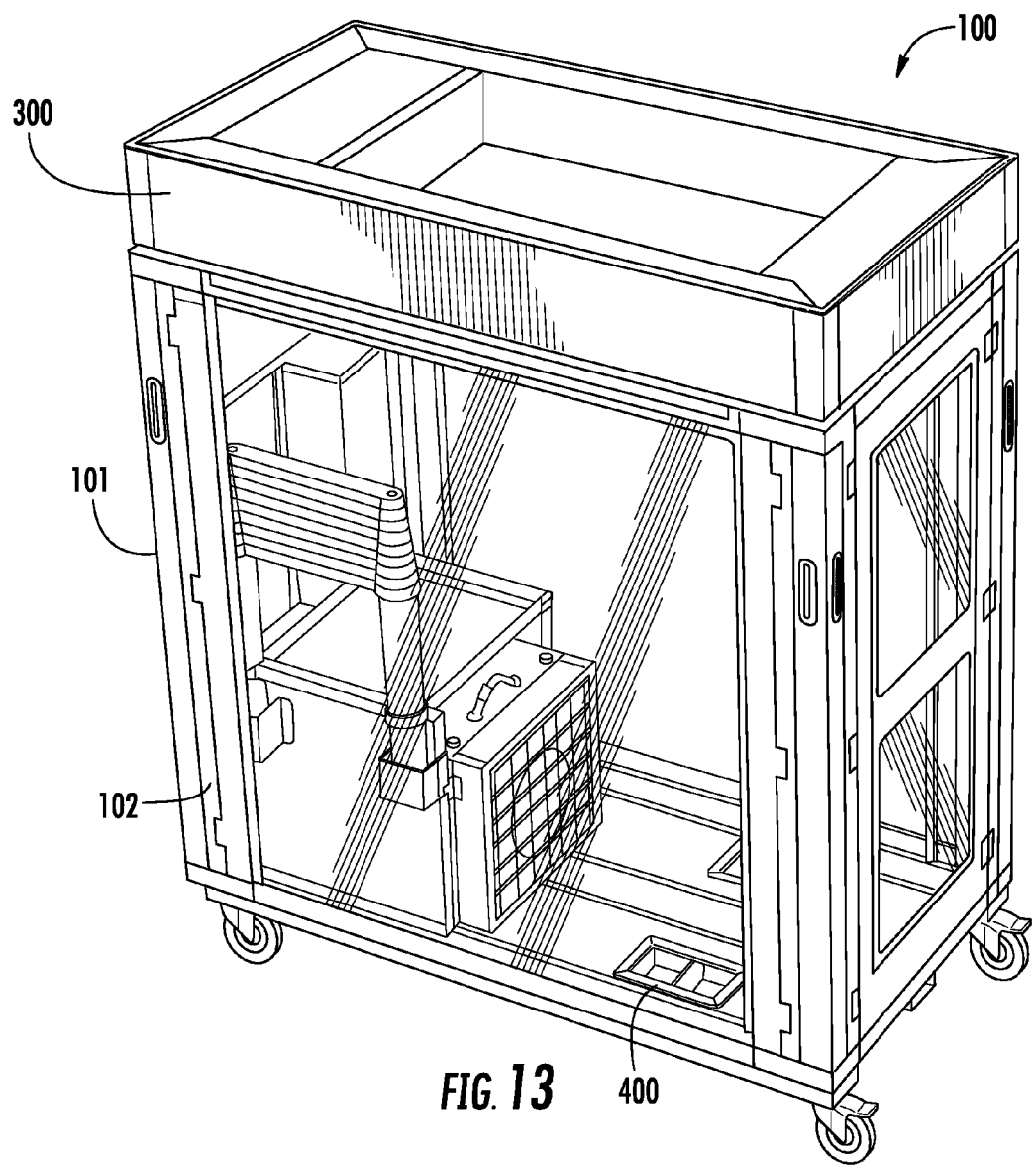
FIG. 13 is a perspective view of the front, top, and left side of the maintenance/construction cart depicted in FIG. 1, shown with the upper structure in the partially lowered position and with various components removed.
Figure 14:
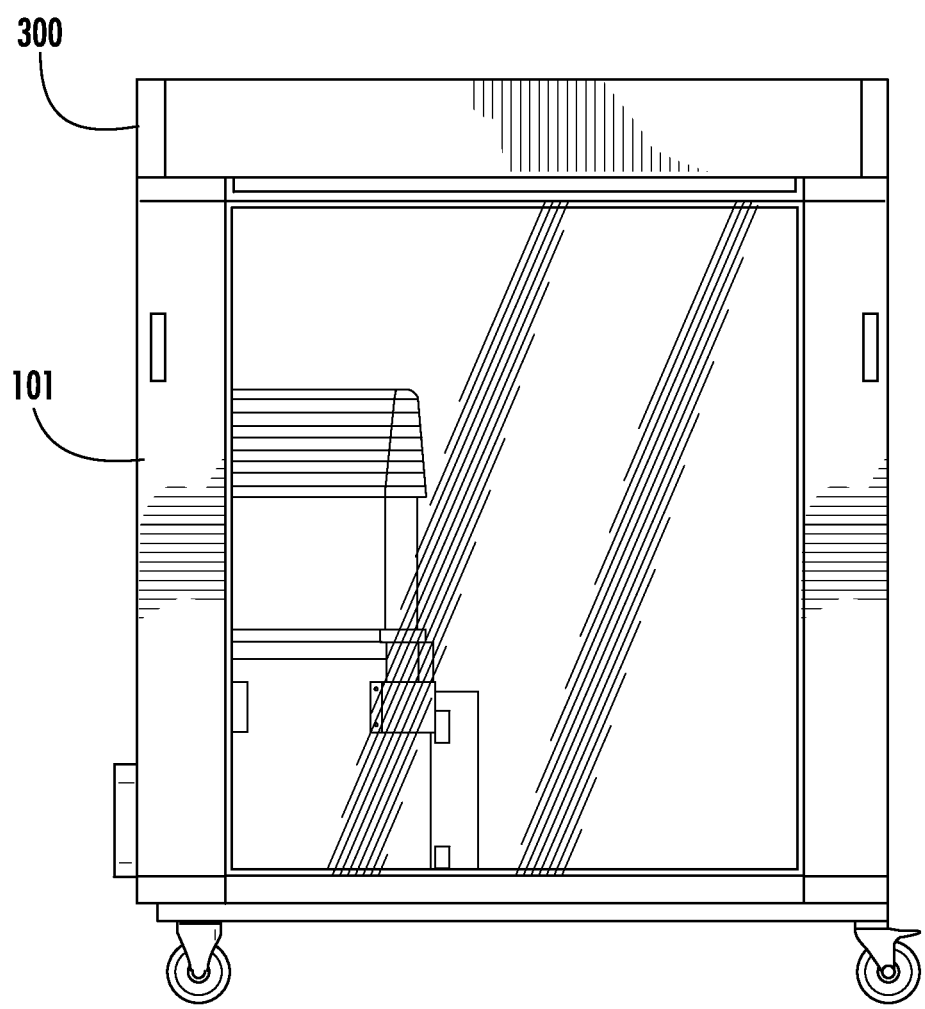
FIG. 14 is a side view of the maintenance/construction cart depicted in FIG. 13.

As shown in FIGS. 1-4, cart 100 also includes an upper structure 300 above an upper portion 105 of lower structure 101. As described in more detail below, a plurality of structural members (e.g., telescoping posts 306 in the illustrated embodiment) connect the upper structure 300 to the upper portion 105 of the lower structure 101 and enable the upper structure 300 to move relative to the lower structure 101. Specifically, upper structure 300 is configured to move between a stowed position (see, e.g., FIGS. 13 and 14) and a raised position (see, e.g., FIGS. 1 and 2) relative to the lower structure 101. In this way, movement of upper structure 300 allows for adjustment of the overall height of the cart 100. FIGS. 1 and 2 illustrate the upper structure 300 in a raised position that facilitates access to a maintenance area generally corresponding to the height of the cart 100 when in the raised position, for example, but not limited to, 10-foot ceilings, 12-foot ceilings, or taller or shorter ceilings. FIGS. 13-14 illustrate the cart 100 in the stowed position, with upper structure 300 adjacent the upper portion 105 of the lower structure 101, reducing the overall height of the cart 100 and allowing cart 100 to be easily maneuvered and pass through doorways.

Figure 8:
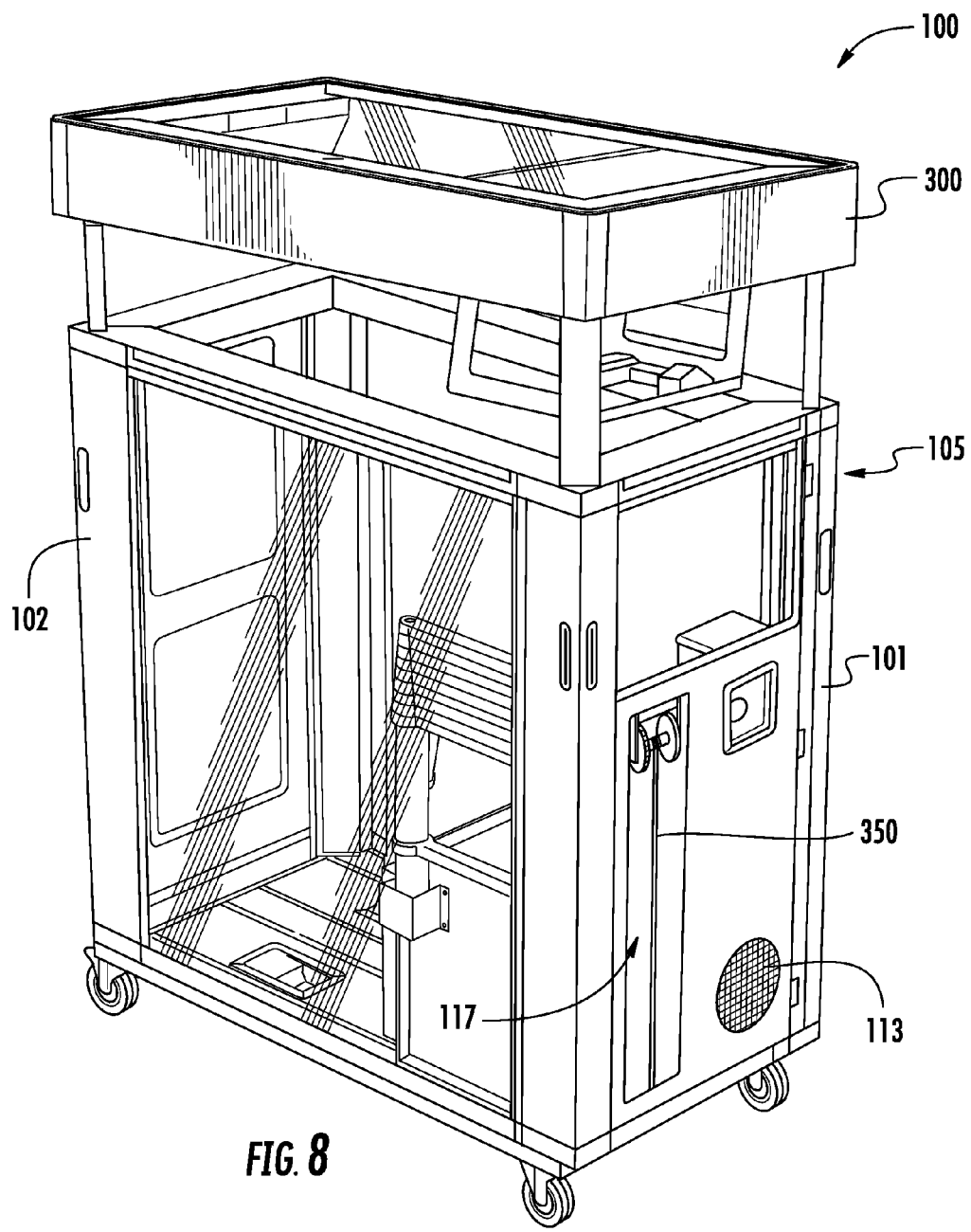
FIG. 8 is another perspective view of the rear, top, and right side of the maintenance/construction cart depicted in FIG. 1, shown with the upper structure in the partially lowered position and with various components removed.

The upper structure 300 is configured so that it may be adjusted to any suitable height between the stowed position and the raised position as desired. FIG. 8 illustrates the cart 100 in a position between the stowed position and the raised position. Upper structure 300 may be formed of any suitable material including, but not limited to, aluminum, anodized aluminum, steel, stainless steel, aramid fibers, Lexan, polycarbonate, polypropylene, other metallic or sheet metal materials, composite materials, or other materials.

Moreover, upper structure 300 is configured as a rigid and structurally secure structure that serves as an independent support for a ladder (such as ladder 108 described below) that is positioned against upper structure 300, as described below. In particular, upper structure 300 is designed to receive and support an end of ladder 108 at a proper angle without bending, deflection, rocking, or vibration. For example, the cart 100 and upper structure 300 are configured such that a 300 lb. person can safely stand on a ladder without any safety concerns.

As illustrated in FIGS. 1-5, the upper structure 300 includes four sides having a substantially vertical structural member (e.g., telescoping posts 306 in the illustrated embodiment), which may be located at each corner of the upper structure 300. Moreover, each side of the upper structure 300 may have an efficient box-frame structural design that includes an inner member 321, an outer member 322, an upper member 323, and a lower member 324 connected to one another (forming a box-shaped cross-section). Such a structural design helps ensure that the upper structure 300 can withstand bending and shear loads applied due to various loading conditions based on a person standing on ladder. In some embodiments, the upper structure 300 is approximately 4 to 12 inches tall. In some embodiments, the upper structure 300 is approximately 8 inches tall. The structural rigidity of cart 100 can be further enhanced when the upper structure 300 is pressed upward against a surface.

Figure 5:
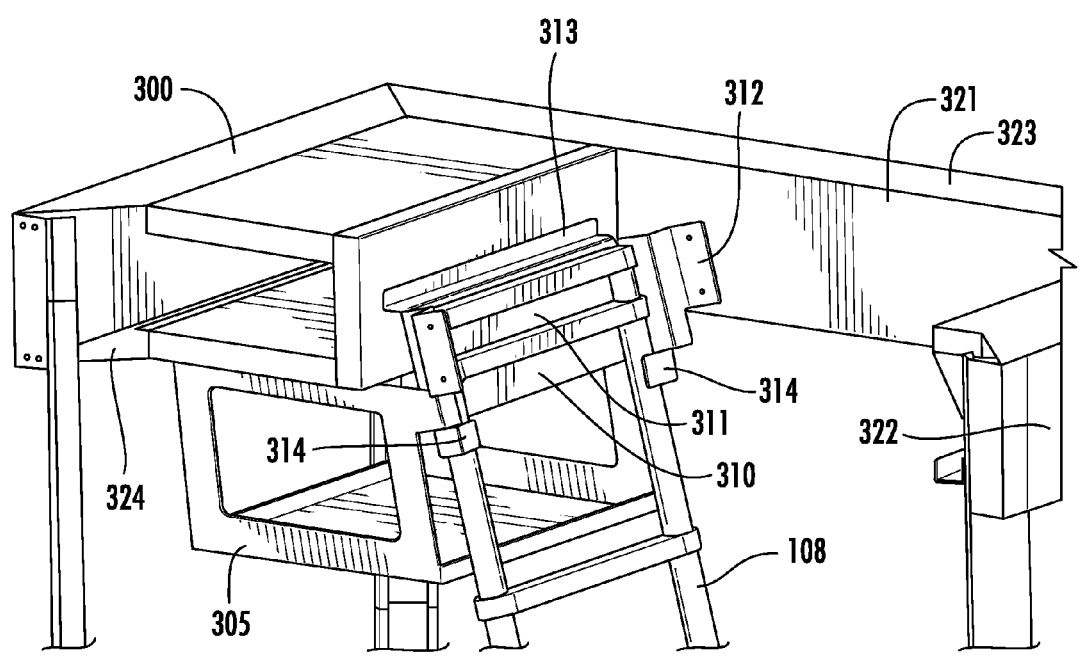
FIG. 5 is a perspective view of a portion of the maintenance/construction cart depicted in FIG. 1, shown with various components removed.

In some embodiments, the upper structure 300 includes a ladder support unit configured to receive and support an end of a ladder, such as ladder 108. As shown in the embodiment of FIG. 5, one example of the ladder support unit is ladder support bracket 310, which interfaces with an upper portion of ladder 108. In some embodiments, ladder support bracket 310 is attached to the upper structure 300 using two side support brackets 312 and center support bracket 313, although ladder support bracket 310 may be attached to upper structure 300 in any suitable way. The upper portion of ladder 108 rests against rear surface 311 of ladder support bracket 310. The ladder support bracket 310 may also include one or more ladder securing mechanisms 314 such as a tab and/or a strap configured to secure the ladder 108. In some embodiments, ladder securing mechanism 314 includes a strap that loops around the ladder 108 and that can be fastened using hook and loop or any other fastening means. Another example of securing mechanism 314, as illustrated in FIG. 5, is a plurality of tabs 314, which are disposed substantially parallel to rear surface 311 such that ladder 108 can be trapped between rear surface 311 and tabs 314. Such an arrangement can secure the ladder and keep the ladder from moving laterally or fore/aft. The tabs 314 may be permanently attached, removeably attached, or hingedly attached. If the tabs 314 are permanently attached, the ladder 108 must be inserted between rear surface 311 and tabs 314. If the tabs 314 are removeably or hingedly attached, the tabs 314 may be secured in a deployed position using pins, conventional/quick-release fasteners, or any other fastening means.

Figure 3:
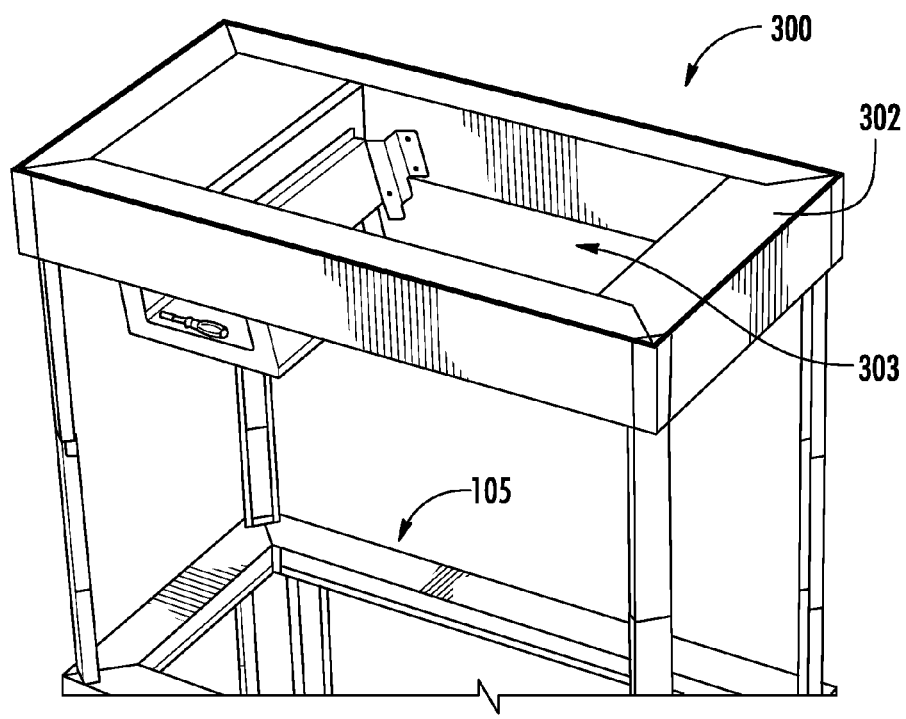
FIG. 3 is a partial perspective view of the front, top, and left side of the upper structure of the cart depicted in FIG. 1, shown with the sealing members removed.
Figure 4:
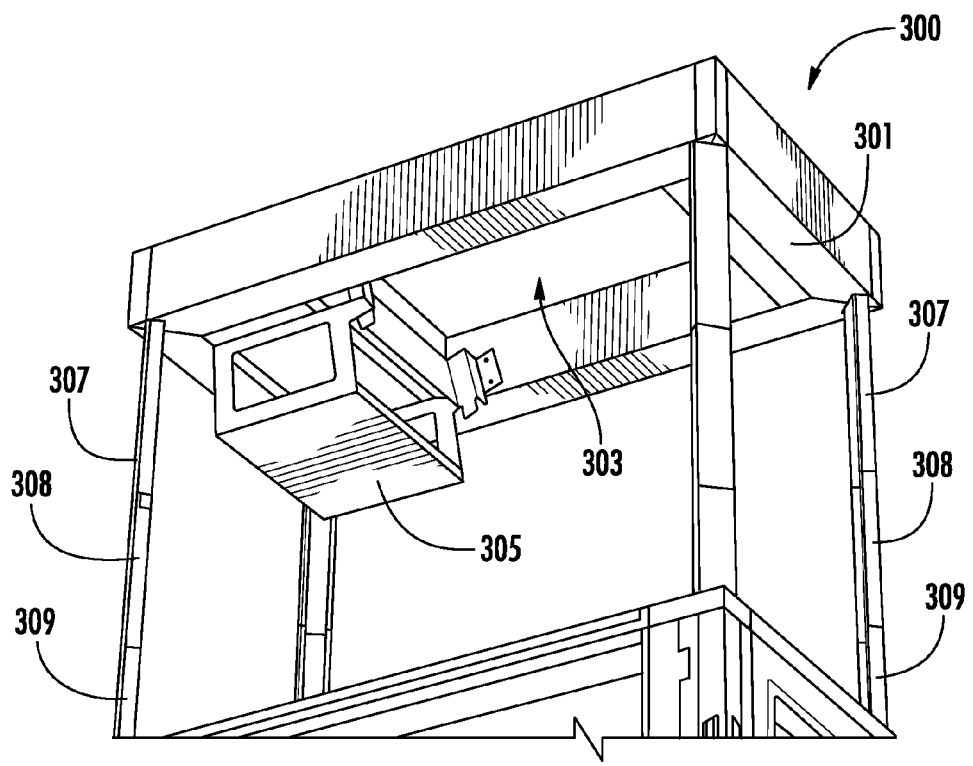
FIG. 4 is a partial perspective view of the front, bottom, and left side of the upper structure of FIG. 3.

As shown in FIGS. 3 and 4, upper structure 300 also includes an opening 303 that extends from a lower surface 301 of the upper structure 300 to a top surface 302 of the upper structure 300 to permit access from the interior of cart 100 to a ceiling, wall, or other structure external to cart 100. As shown in FIGS. 1 and 2, a cover 121 may extend across the opening 303 to control access through opening 303 and seal the interior of the cart 100 from an environment surrounding the cart 100 when the cart 100 is not arranged with opening 303 adjacent to a ceiling, wall, or other structure external to cart 100. The cover 121 may be permanently or removably coupled to upper structure 300 in any suitable way, for example, but not limited to, using slide fasteners such as zippers, hook and loop fasteners, pivoting means, sliding means, sealing means, any type of mechanical fastener, etc. Although cover 121 is illustrated as positioned along top surface 302, cover 121 may be disposed at lower surface 301 or at any position where the cover 121 can cover opening 303. The cover 121 may be constructed from any suitable material such as, but not limited to, plastic with reinforced scrim, Nomex®, aluminum, steel, aramid fibers, other types of plastic, other metallic or sheet metal materials, composite materials, or other suitable materials. The cover 121 may be transparent, translucent, or opaque.

In some embodiments, the upper structure 300 may include a gasket 120 around a perimeter of top surface 302. When placed adjacent to a ceiling, the gasket 120 compresses to form a seal between the upper structure 300 and the ceiling to ensure that any harmful particles or contaminants are directed into the interior of cart 100 to be filtered and not released into the surrounding environment. The gasket 120 may be, for example, a one inch closed cell neoprene gasket or any other suitable gasket.

Cart 100 also includes an upper structure adjustment mechanism that moves the upper structure 300 between the stowed position and the raised position or any suitable position between the stowed and raised positions. In some embodiments, the upper structure adjustment mechanism is configured to move some or all of the structural members generally simultaneously so that the upper structure 300 remains generally level during its movement. Although a single upper structure adjustment mechanism is illustrated herein, multiple upper structure adjustment mechanisms may be used. In some embodiments, the upper structure adjustment mechanism helps maintain the top surface 302 in an approximately parallel relationship with upper portion 105 of lower structure 101. One non-limiting example of an upper structure adjustment mechanism is a pulley system, although any suitable adjustment mechanism may be used. One non-limiting example of a suitable pulley system is illustrated and described below, but it should be understood that any suitable pulley system or other adjustment mechanism may be used.

The structural members that connect the upper structure 300 to the upper portion 105 of the lower structure 101 each may be a single solid member, a telescoping member, or any suitable component. One example, as shown in FIGS. 1-2, includes four telescoping posts 306 that connect upper structure 300 to upper portion 105 of lower structure 101 and are configured to telescope to move upper structure 300 between its stowed position and its raised position (or any suitable position therebetween). Although a telescoping post 306 is illustrated as positioned at each of the four corners of lower structure 101, telescoping posts 306 may be positioned in other locations along lower structure 101 and any suitable number of telescoping posts may be used. As shown in FIG. 4, each telescoping post 306 includes an upper portion 307, a middle portion 308, and a lower portion 309 that move with respect to one another (i.e., telescope) as needed to raise and lower upper structure 300. Telescoping post 306 may have any suitable number of telescoping portions.

Figure 9:
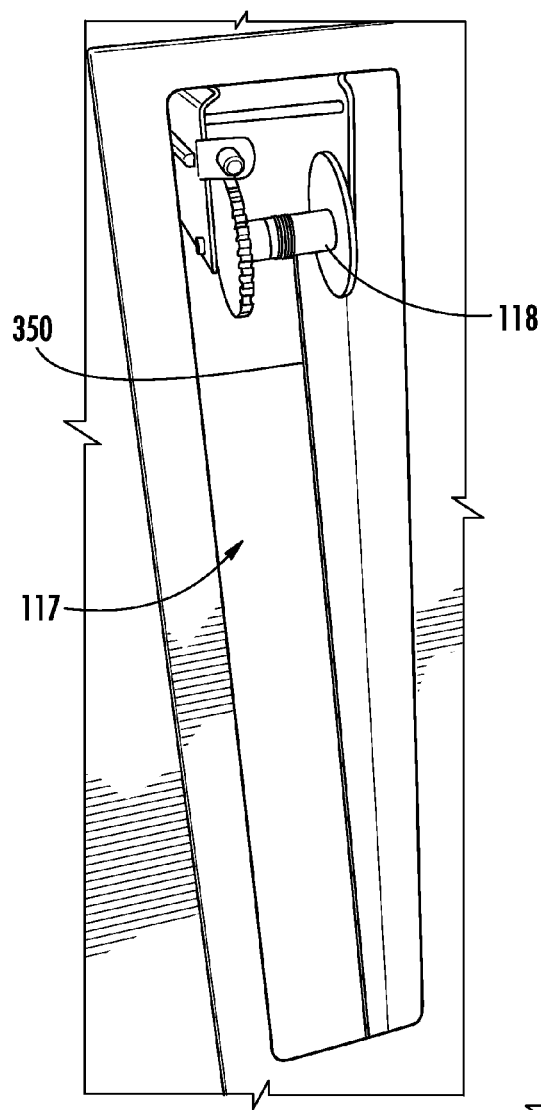
FIG. 9 is a close-up view of the rear side of the cart depicted in FIG. 8.
Figure 10:
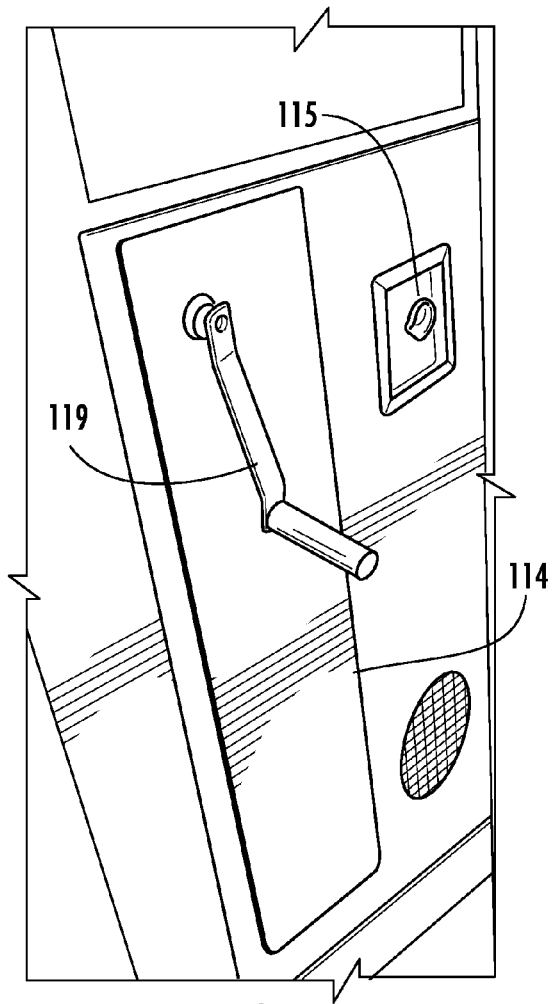
FIG. 10 is a close-up view of the rear side of the cart depicted in FIG. 9, shown with an access door.

As shown in FIGS. 6-10, pulley system may include any suitable number of cables 350 disposed in telescoping posts 306 and routed through one or more pulleys to an actuator, such as winch 118 and hand crank 119 (FIGS. 9-10). As illustrated, each telescoping post 306 includes a separate cable 350, although any suitable number of cables may be used. Actuation of the winch 118 moves the one or more cables 350, which in turn causes one or more of the telescoping posts 306 to move. In some embodiments, winch 118 is configured to spool the cables 350 such that each telescoping post 306 extends or contracts generally simultaneously with the other telescoping posts 306 resulting in smooth and level vertical movement of the upper structure 300 in the desired direction.

Figure 6:
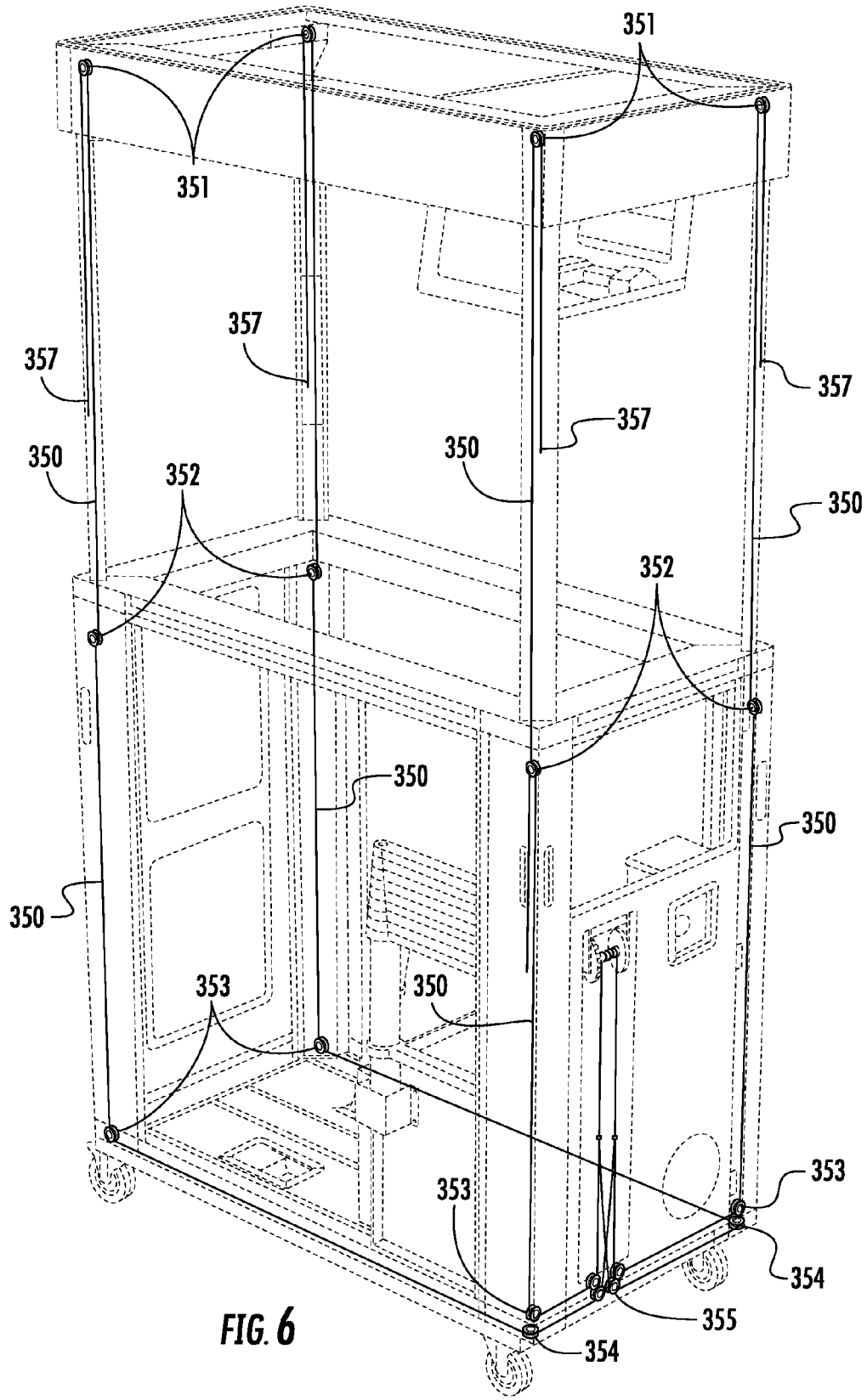
FIG. 6 is a perspective view of a non-limiting embodiment of a pulley system positioned within the maintenance/construction cart depicted in FIG. 1.
Figure 7A:
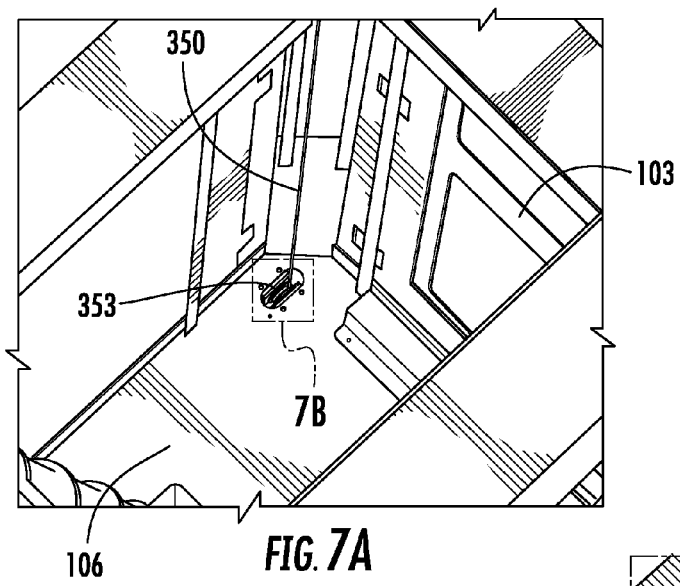
FIG. 7A is a perspective view of a portion of the floor of the cart depicted in FIG. 1, shown without a cover.
Figure 7B:
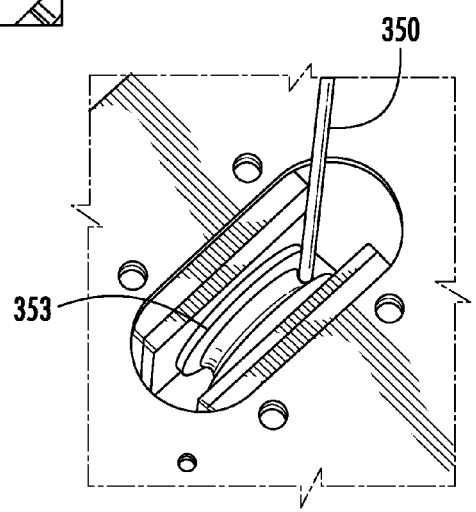
FIG. 7B is an enlarged view of a portion of FIG. 7A, taken at inset square 7B.

In the non-limiting embodiment of FIG. 6, each telescoping post 306 includes an upper telescoping pulley 351 and a lower telescoping pulley 352. Each cable 350 has an end 357 that may be attached to a fitting 357 located adjacent to or inside the respective telescoping post 306 or may be otherwise secured. As shown in FIGS. 6, 7A, and 7B, after interfacing with lower telescoping pulley 352, the cable 350 passes through floor 106 and interfaces with a floor pulley 353, shown in FIGS. 7A and 7B. The floor pulleys 353 redirect the cables 350 approximately ninety degrees from a vertical direction into a horizontal plane such that they ultimately connect with a winch pulley 355. In some embodiments, any or all of cables 350 may pass through intermediate pulleys 354 before passing through the winch pulley 355. As illustrated, the winch pulleys 355 redirect each cable 350 approximately ninety degrees and upward toward the winch 118. The arrangement and number of pulleys can vary and are not limited to the embodiment illustrated.

Figure 7C:
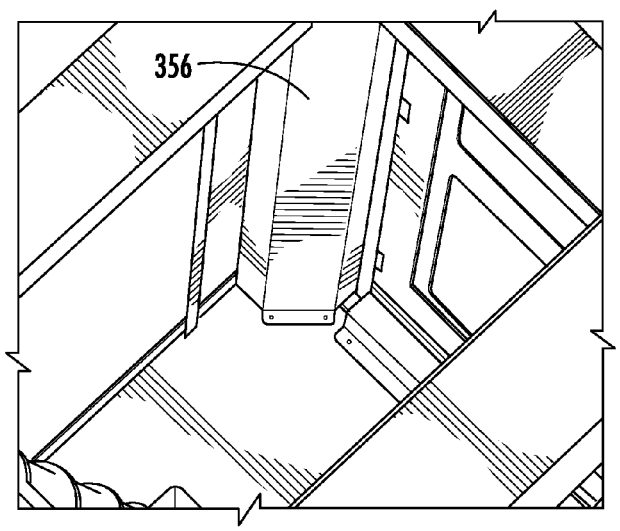
FIG. 7C is a perspective view of the portion of the floor of FIG. 7A, shown with a cover.

As shown in FIG. 7C, a cover 356 may be disposed adjacent to each telescoping post 306 to cover the cable 350 and keep dirt and/or foreign objects out of the upper structure adjustment mechanism. In addition to protecting the upper structure adjustment system as described above, the use of covers 356 may facilitate decontamination procedures by simplifying the internal surfaces to be cleaned.

If more than one cable 350 is used, the cables 350 may be consolidated using fittings to reduce the number of cables 350 that attach to the winch 118. For example, in some embodiments, the cables corresponding to two opposite posts are connected (i.e., the left front cable and the right rear cable are connected). Such a pairing of cables 350 provides a potential failsafe such that, in the event of a failure, the remaining cables 350 (including two opposite cables 350) are still operational to raise and lower the upper structure 300.

In some embodiments, as shown in FIGS. 8-10, the winch 118 may be gear driven and may be disposed in a winch compartment 117. The winch compartment 117 may include a winch access door 114 that restricts access to winch 118 but that can be removed/opened to conduct maintenance operations related to the winch 118 or cable 350. As shown in FIGS. 9 and 10, whether winch access door 114 is open or closed, a user may actuate the winch 118 by interfacing with a gear train for spooling the cable 350 and thus raising/lowering the upper structure 300. One example of an actuator 119 for interfacing with the gear train, as illustrated in FIG. 10, is a hand crank. Other non-limiting examples include corded or cordless drills, manual or power ratchets, pneumatic tools, integral motors, or any other suitable mechanism to actuate winch 118.

The use of a winch to actuate movement of the telescoping posts 306 allows a single operator to raise/lower the upper structure 300 easily and while keeping the upper structure 300 level relative to the lower structure 101. The use of a gear driven winch also provides an inherent braking to ensure that upper structure 300 does not fall or move too abruptly. Although the actuator 119 is illustrated as external to cart 100, as an alternative, the cart 100 may be configured such that the actuator 119 is accessible from inside the cart 100. In addition, the cart 100 may be configured to allow access to actuator 119 from both inside and outside of the cart 100.

As mentioned, the upper structure adjustment mechanism is not limited to the pulley system described herein. Other methods and/or mechanisms may be used to raise or lower the upper structure 300. Non-limiting examples include systems that do or do not use cables including systems using a single electric motor for operating winch 118, individual electric motors for each telescoping post 306, hydraulic based systems, drive screw based systems, pneumatic based systems, etc.

Figure 15:
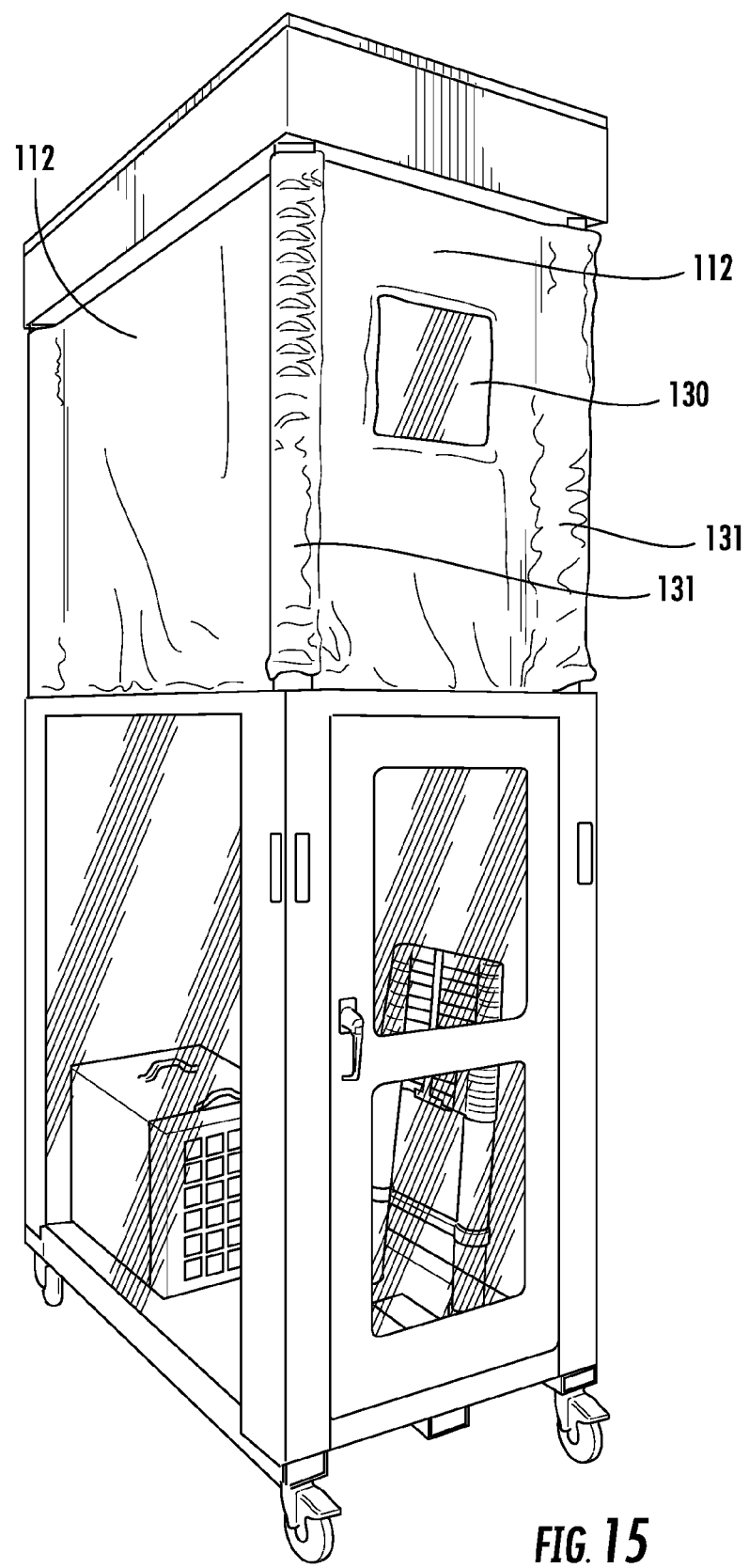
FIG. 15 is another perspective view of the front, top, and left side of a maintenance/construction cart depicted in FIG. 1 with a non-limiting embodiment of a sealing member.

As illustrated in FIGS. 1 and 2, cart 100 also includes one or more sealing members 112 that extend between the upper portion 105 of the lower structure 101 and the upper structure 300 to seal the interior of the cart 100 from the surrounding environment as the upper structure 300 moves out of its stowed position. Each of the one or more sealing members 112 includes a first end that attaches to the upper portion 105 of the lower structure 101 and a second end that attaches to the upper structure 300. Each of the one or more sealing members 112 compresses and expands based on movement of the upper structure 300 relative to the lower structure 101. As shown in FIG. 15, the one or more sealing members 112 may be configured without any predetermined or existing shape/structure (e.g., a flexible or rigid sheet). In some embodiments, as illustrated in FIGS. 1 and 2, each of the one or more sealing members 112 may be flexible bellows that include a plurality of existing folds configured to compress and expand based on movement of the upper structure 300 relative to the lower structure 101 such that the one or more sealing members 112 are configured to expand and contract similar to an accordion. In this way, the one or more sealing members 112 is compliant and capable of moving with the upper structure 300. For example, as shown in FIGS. 1 and 2, the one or more sealing members 112 expand when the upper structure 300 is raised to a 10-foot (or any height) ceiling and compress and/or fold when the upper structure 300 lowers to the stowed position to contact the lower structure 101 (FIGS. 13 and 14).

The one or more sealing members 112 may be formed of any suitable material including, but not limited to, rigid plastic, soft plastic, plastic with scrim reinforcement, Nomex®, aluminum, steel, aramid fibers, other metallic or sheet metal materials, other plastic materials, composite materials, or other similar materials. In some embodiments, the one or more sealing members 112 may include a fire rating or a fire-resistance rating and/or may be transparent, translucent, and/or opaque. In some embodiments, the one or more sealing members 112 are removable to facilitate decontamination procedures. The one or more sealing members 112 may be connected to cart 100 in any suitable way such that they seal the interior of the cart 100 from the surrounding environment. As shown in FIG. 15, the one or more sealing members 112 may include one or more access panels 130 or openings. The access panel/opening 130 may be opened and closed using slide fasteners such as zippers, hook and loop fasteners, pivoting means, sliding means, sealing means, or any type of mechanical fastener. Like the one or more sealing members 112, the access panel/opening 130 may include a fire rating or a fire-resistance rating and/or may be transparent, translucent, and/or opaque. In some embodiments, the one or more sealing members 112 may be one or more rigid components inserted between the upper portion 105 of the lower structure 101 and the upper structure 300. For example, the one or more sealing members 112 may be a set of rigid polycarbonate panels configured to be inserted into mounting channels along lower structure 101 and the upper structure 300.

As shown in FIGS. 1 and 2, cart 100 may include at least one air filtration unit 111 disposed either outside or inside the lower structure 101. In the embodiment illustrated in FIG. 2, air filtration unit 111 is adjacent to and/or connected to at least one or more duct units 113 that communicate with the environment surrounding cart 100. Air filtration unit 111 helps capture and filter hazardous and/or non-hazardous particulate, biological, and gas phase contaminants present within the interior of the cart 100. In some embodiments, air filtration unit 111 may have the ability to create negative air pressure inside the cart 100. The cart 100 may be configured modularly such that various products can be used for the air filtration unit 111. One non-limiting example of an air filtration unit 111 is the HEPA-AIRE® PAS600 Portable Air Scrubber offered by Abatement Technologies. The cart 100 may be configured to include a remote variable control module for controlling air filtration unit 111 where the control module may be disposed inside or outside the cart 100. The control module may be used to change the speed of air filtration unit 111 to change or maintain a proper negative pressure within the cart 100. In some embodiments, the control module is accessible while standing on ladder 108.

When located outside of cart 100, air filtration unit 111 is disposed on an auxiliary cart attached or connected to cart 100 such that the auxiliary cart does not need to be moved separately from cart 100. The auxiliary cart allows for a wider range of product selection (e.g., where a bigger high capacity unit may be required).

Because the cart 100 is capable of maintaining a negative air pressure inside the cart based on the operation of the air filtration unit 111, the cart 100 may include provisions to constrain the one or more sealing members 112 to prevent collapsing or significant deflection of the sealing members 112 toward the interior of cart 100. One example of such a provision, as illustrated in FIG. 15, is one or more sleeves 131, which wrap around each structural member (e.g., telescoping post 306). The sleeves 131 constrain the one or more sealing members 112 to ensure they do not significantly encroach on the space of the interior of cart 100 such that a user is not hindered when conducting maintenance operations.

Cart 100 also includes one or more ladders 108 configured to reach the opening 303 of the upper structure 300 (see FIGS. 1 and 2) and facilitate operator access to a ceiling or wall. The ladder 108 may telescope or otherwise be adjustable in height, and/or be collapsible to a non-deployed position 109 for storage of the ladder. In some embodiments, the collapsible ladder 108 may be an extension ladder. The ladder 108, in certain embodiments, may be fiberglass, which is particularly appropriate for electrical work. Other non-limiting examples of materials for ladder 108 include aluminum, steel, and wood. In some embodiments, cart 100 may include a storage unit 110 configured to hold the ladder 108 in the non-deployed position 109. In other embodiments, the one or more ladders 108 may be configured to fold down from an upper portion of the cart 100.

Figure 11:
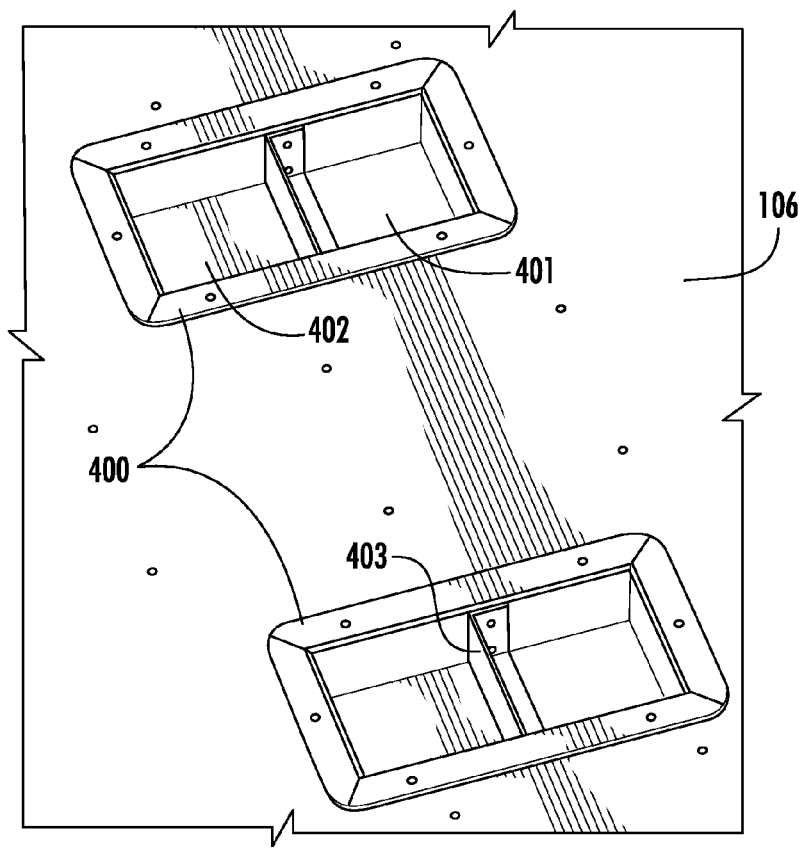
FIGS. 11 and 12 are close-up views of two recesses of the cart depicted in FIG. 1.
Figure 12:
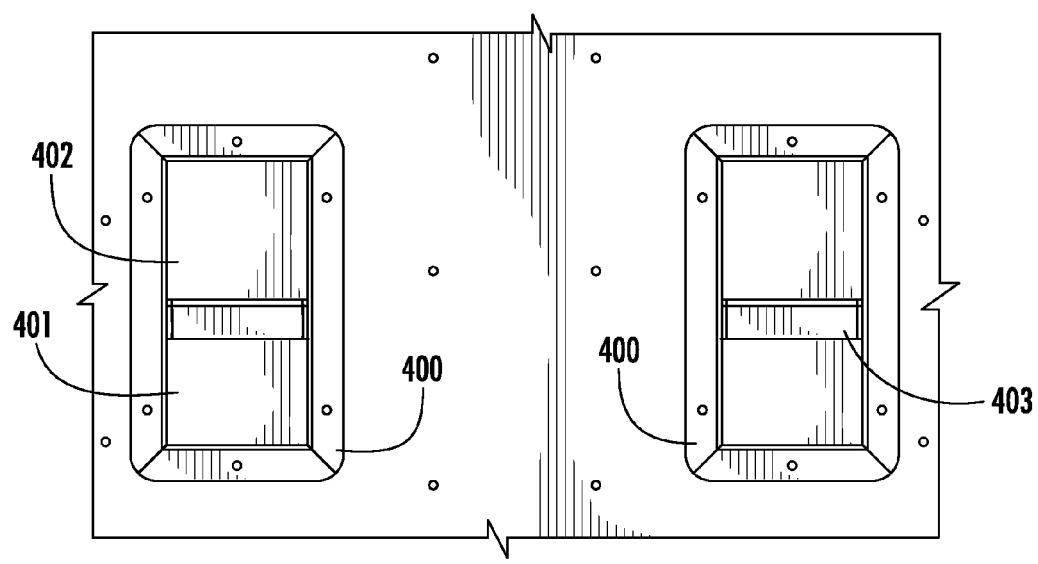

In some embodiments, as shown in FIGS. 11 and 12, the floor 106 may include one or more ladder securing units 400. The ladder securing units 400 may be protrusions, non-skid/non-slip layers (applied using an adhesive layer or applied as a coating), recesses, or any suitable feature or combination of features configured to secure a lower portion of ladder 108. One example, as illustrated in FIGS. 11 and 12, is recesses 400, where each recess 400 may have a single cavity or a plurality of cavities (401, 402, etc.) configured to interface with a lower portion of the ladder 108. The recess 400 may be configured with any suitable dimensions to match the foot of the ladder 108. Each cavity may be configured to arrange the ladder 108 at a predetermined angle based on a given height of the opening 303 of the upper structure 300. As shown in the embodiment of FIGS. 11 and 12, floor 106 includes a pair of recesses 400, each recess having a first cavity 401 and a second cavity 402 configured to arrange the ladder at a different predetermined angle (i.e., placing the lower portion of the ladder in the first cavities 401 will arrange the ladder at a first predetermined angle while placing the lower portion of the ladder in the second cavities 402 will arrange the ladder at a second predetermined angle that is different from the first predetermined angle). For example, the first cavities 401 may be configured to hold the ladder at an OSHA-compliant angle when the ladder is adjusted to interface with the upper structure 300 when arranged for an 8.5-foot ceiling (or other height) configuration, and the second cavities 402 may be configured to hold the ladder at an OSHA-compliant angle when the ladder 108 is adjusted to interface with the upper structure 300 when arranged for a 10-foot ceiling (or other height) configuration. Optional dividers 403 may be used to separate the plurality of cavities from one another. In addition, if present, the plurality of cavities (401, 402, etc.) function as a safety feature to secure the ladder 108 and prevent unwanted movement of the ladder 108. In some embodiments, each recess is configured without a divider 403 such that the lower portion of ladder 108 can be disposed in the one or more recesses for various heights of the upper structure 300 while maintaining an acceptable (e.g., OSHA compliant) ladder angle. As described above, ladder securing units 400 may be protrusions such as lips, ridges, bars, or any feature or combination of features configured to interface with the lower portion of ladder 108.

The cart 100 may, in some embodiments, include an electrical connection unit 115 that provides electrical power to the cart 100. The electrical connection unit 115 may be configured to supply power to covered electrical outlets that may be located inside and/or outside the cart 100. The cart 100 may also include two or more casters 107 to facilitate movement of the cart 100. In some embodiments, one or more of the casters 107 include a lock. As shown in FIG. 4, the cart 100 may include a storage shelf 305 configured to move with the upper structure 300 or remain in a static position regardless of the position of the upper structure 300. The storage shelf 305 is not present in some cases.

The cart 100 may include various other components such as an internal light, a pressure monitoring system, a detection and alarm system for when the upper structure 300 reaches a height limit (such as a ceiling) that may utilize a pressure or proximity switch, a cleaning/sanitizing system with compressed air, floor drains, a first aid kit, an eye wash system, an adhesive mat near access door 103, and/or any other desired component or feature.

Any of the components of the cart 100 may be attached to one another via suitable fasteners, which include, but are not limited to, screws, bolts, rivets, 3M® Very High Bond (VHB) tape, other acrylic foam tapes, or other mechanical or chemical fasteners. In some embodiments, the components of the cart 100 are assembled using seals/gaskets to minimize airflow thus reducing the transmission of hazardous airborne contaminants from the interior of the cart to the external environment.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A maintenance cart comprising:
   a lower structure comprising an upper portion and a plurality of sides that extend between the upper portion and a floor;
   an upper structure disposed above the upper portion of the lower structure, the upper structure comprising a structural member at each corner of the upper structure, wherein the upper structure receives an adjustable height ladder and structurally supports the adjustable height ladder and wherein the structural members connect the upper structure to the upper portion of the lower structure and move the upper structure relative to the lower structure between a stowed position and a raised position; and
   a single upper structure adjustment mechanism that moves all of the structural members simultaneously such that the upper structure remains level during movement of the upper structure,
   wherein the maintenance cart comprises an interior workspace defined by the lower structure and the upper structure (i) when the upper structure is in the stowed position and (ii) when the upper structure is in the raised position.

2. The maintenance cart of claim 1, wherein each of the structural members comprises one or more telescoping members.

3. The maintenance cart of claim 1, wherein the single upper structure adjustment mechanism comprises a pulley system that routes one or more cables through one or more pulleys such that movement of the one or more cables causes movement of one or more of the structural members.

4. The maintenance cart of claim 3, wherein at least one of the one or more cables is spooled on a winch that moves all of the structural members simultaneously.

5. The maintenance cart of claim 4, further comprising an actuator that operates the winch to move all of the structural members simultaneously.

6. The maintenance cart of claim 5, wherein the actuator is a hand crank or a power tool.

7. The maintenance cart of claim 1, wherein the adjustable height ladder is a collapsible ladder that reaches an opening on a top surface of the upper structure.

8. The maintenance cart of claim 1, further comprising at least one sealing member, wherein:
   a first end of the at least one sealing member attaches to the upper portion of the lower structure;
   a second end of the at least one sealing member attaches to the upper structure;
   the at least one sealing member compresses and expands based on movement of the upper structure relative to the lower structure; and the at least one sealing member creates a seal between the interior workspace of the maintenance cart and an environment surrounding the maintenance cart.

9. The maintenance cart of claim 8, wherein the at least one sealing member comprises a plurality of folds that collapse onto each other when the at least one sealing member is in a folded position.

10. The maintenance cart of claim 8, wherein the at least one sealing member includes a sleeve that wraps around one or more of the structural members to constrain the at least one sealing member.

11. The maintenance cart of claim 1, wherein the floor comprises one or more ladder securing units that secure a lower portion of the adjustable height ladder relative to the floor.

12. The maintenance cart of claim 11, wherein each ladder securing unit comprises a recess having at least one cavity that receives the lower portion of the adjustable height ladder,
wherein the at least one cavity arranges the adjustable height ladder, when the lower portion of the adjustable height ladder is received within the at least one cavity, at a predetermined angle based on a height of an opening on a top surface of the upper structure.

13. The maintenance cart of claim 1, further comprising a gasket that forms a seal on a top surface of the upper structure against a ceiling when the upper structure is in the raised position.

14. A maintenance cart comprising:
a lower structure with an upper portion and a plurality of sides that extend between the upper portion and a floor;
an upper structure disposed above the upper portion of the lower structure, the upper structure comprising a structural member at each corner of the upper structure and a ladder support unit that receives a ladder and structurally supports the ladder, wherein the structural members connect the upper structure to the upper portion of the lower structure and move the upper structure relative to the lower structure between a stowed position and a raised position; and
a single upper structure adjustment mechanism that moves all of the structural members simultaneously such that the upper structure remains parallel to the floor during movement of the upper structure,
wherein the maintenance cart comprises an interior workspace defined by the lower structure and the upper structure (i) when the upper structure is in the stowed position and (ii) when the upper structure is in the raised position.

15. The maintenance cart of claim 14, wherein one or more ladder securing mechanisms secures the ladder in position with respect to a rear surface of the ladder support unit.

16. A maintenance cart comprising:
a lower structure with an upper portion and a plurality of sides that extend between the upper portion and a floor;
an upper structure disposed above the upper portion of the lower structure, the upper structure comprising a structural member at each corner of the upper structure and a ladder support unit that receives a ladder and structurally supports the ladder, wherein the structural members connect the upper structure to the upper portion of the lower structure and move the upper structure relative to the lower structure between a stowed position and a raised position;
at least one ladder securing unit that secures a lower portion of the ladder relative to the floor; and
a single upper structure adjustment mechanism that moves all of the structural members simultaneously such that the upper structure remains level and parallel to the floor during movement of the upper structure,
wherein the maintenance cart comprises an interior workspace defined by the lower structure and the upper structure (i) when the upper structure is in the stowed position and (ii) when the upper structure is in the raised position.

17. The maintenance cart of claim 16, wherein each ladder securing unit comprises a recess having at least one cavity that receives the lower portion of the ladder,
wherein the at least one cavity arranges the ladder, when the lower portion of the ladder is received within the at least one cavity, at a predetermined angle based on a given height of an opening on a top surface of the upper structure.

18. The maintenance cart of claim 1, wherein a volume of the interior workspace is smaller when the upper structure is in the stowed position compared to when the upper structure is in the raised position.

19. The maintenance cart of claim 1, wherein the upper structure comprises a ladder support bracket that secures the adjustable height ladder.

20. The maintenance cart of claim 19, wherein the ladder support bracket comprises a plurality of supports that each attach to an inner member of the upper structure.

21. The maintenance cart of claim 19, wherein the ladder support bracket comprises a rear surface and a plurality of tabs such that the adjustable height ladder is trapped between the rear surface and the plurality of tabs.

22. The maintenance cart of claim 3, wherein the pulley system comprises an individual cable for each structural member of the upper structure.

23. The maintenance cart of claim 22, wherein each individual cable of the pulley system is simultaneously spooled on one winch.

24. The maintenance cart of claim 14, wherein a volume of the interior workspace is smaller when the upper structure is in the stowed position compared to when the upper structure is in the raised position.

25. The maintenance cart of claim 14, wherein the ladder support unit comprises a ladder support bracket that secures the ladder.

26. The maintenance cart of claim 25, wherein the ladder support bracket comprises a plurality of supports that each attach to an inner member of the upper structure.

27. The maintenance cart of claim 25, wherein the ladder support bracket comprises a rear surface and a plurality of tabs such that the ladder is trapped between the rear surface and the plurality of tabs.

* * * * *